Figure 1:
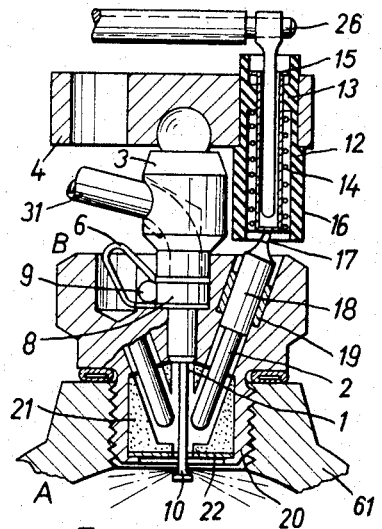

March 19, 1968

H. PAPST 3,373,724

FUEL INJECTION AND IGNITION DEVICE
FOR INTERNAL COMBUSTION ENGINES

Filed Feb. 8, 1965

3 Sheets-Sheet 1

Inventor:
Hermann Papst by
Michael J. Striker
attorney

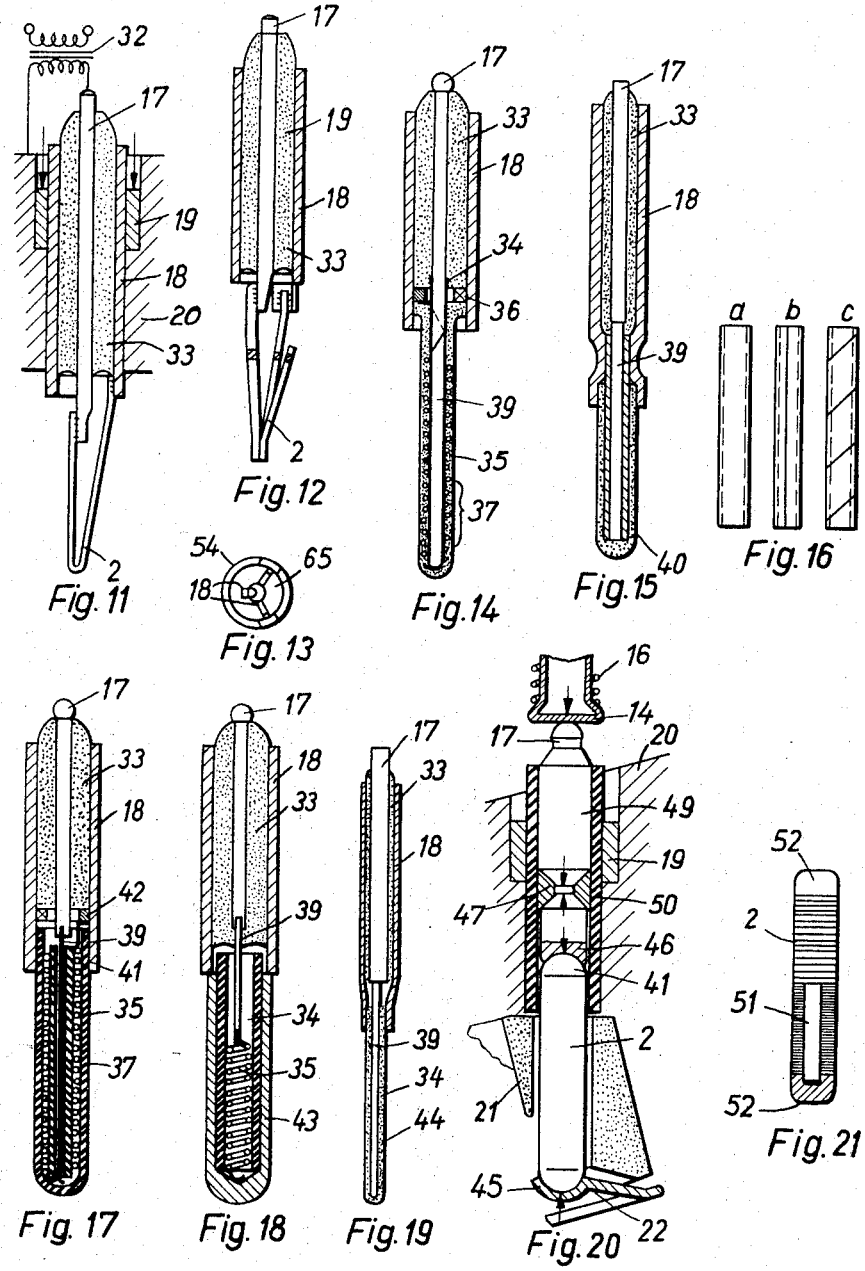

Inventor:
Hermann Papst by
Michael J. Striker
attorney

United States Patent Office 3,373,724
Patented Mar. 19, 1968

3,373,724
FUEL INJECTION AND IGNITION DEVICE FOR INTERNAL COMBUSTION ENGINES
Hermann Papst, St. Georgen, Black Forest, Germany
Filed Feb. 8, 1965, Ser. No. 430,844
Claims priority, application Germany, Feb. 10, 1964,
P 33,560
23 Claims. (Cl. 123—32)

The present invention relates to a unitary fuel injection and ignition device for internal combustion motors.

In the operation of piston type internal-combustion engines arrangements have already been proposed for the injection and for the external ignition of the fuel as soon as possible at the beginning of each injection.

In a prior proposal by the present applicant the injection nozzle and the ignition device form a constructional unit with a hollow body which consists of material which conducts heat poorly, the inner wall of the hollow body being so arranged that it is not directly struck by the stream of fuel. The free space within this hollow body is limited to a very small volume so that the fresh air flowing in during the compression stroke is rapidly heated to a high degree. The droplets scattered from each new jet of fuel thus ignite with a very short ignition delay in the hot boundary layer of air overlying the heated incandescent body, or directly on the body itself and also on the free wall surfaces of the hollow body, which becomes heated owing to its thermal insulation. The practically instantly resultant initial flame then rapidly extends into the combustion space with the distributed jet of fuel.

Investigation has now shown that the temperature of the incandescent body should lie substantially above the temperatures of continuous operation attainable with the usual heat-conductive alloys. Only then does the air in the heat-insulating body become heated hot enough within the compression period before each individual injection. Otherwise there is the danger, that soon after the medium speeds of rotation, the wall-temperature of the hollow body might drop below the limit at which sufficiently reliable ignition is maintained.

It has also proved to be very difficult to separate from the jet of fuel a fraction such that on the one hand it is sufficient for initial ignition and on the other hand is not so large that the hot body is excessively cooled.

Research has also shown that with the hot body concentrically surrounding the jet of fuel too great a heating power is required. The working life was also too limited, especially in engines operating at high power.

It is therefore a main object of the invention to provide an arrangement of the type mentioned which is comparatively simple in its structure and reliable in operation and which will not be subject to the aforementioned limitations.

The invention concerns a new injection and ignition device for internal-combustion engines and consists therein that the heat insulation of the unitary structure forms a hollow body with recesses and that the incandescent body is formed as a pin with small incandescent surfaces and projects into an appropriate recess with narrow interstices, the arrangement being such that the hot surfaces of the incandescent pin and the recesses of the hollow body are struck by only a few scattered droplets of fuel.

The advantage of the arrangement with the new pin-shaped hot body as compared with a hollow hot body concentrically embracing the jet of fuel consists in the considerable reduction in the surface of the hot body which is produced and in the reduction of the heating energy which is thus made possible. As compared with some 100 watts for conventional glow-plug ignition this power is reduced to from 15 to 20 watts, that is, it is reduced to one fifth. The incandescent body can thus be supplied with current even during starting.

The air space within the heat-insulating hollow body, which is reduced to a minimum, may amount to a few cubic millimeters for very small motors and up to a few cubic centimeters for large diesel engines.

The heating current conductors for the incandescent pin may be very much better protected against oxidation than in the former incandescent hot body with internal incandescent surface.

The incandescent body of pin form may consist, for example, of a helix tightly wound about an insulating core, or preferably, of a helical heater concentrically surrounding a return lead.

Because of the small heater power required and the small dimensions of the incandescent pin it becomes possible to build the unitary structure within the dimensions of a commercial ignition plug, and in addition to dispose further incandescent pins within this structure. A considerable increase of ignition reliability is obtained by using such additional pins.

In place of a further externally heated incandescent pin there may be provided a pin heated only by the combustion. This then serves as an additional auxiliary igniter. With such a pin, formed for example of quartz-glass, it is also possible to observe the combustion within the cylinder, since the pin always remains burnt clean and as a result is transparent. Such a transparent, non-crystalline material radiates almost no heat, so that it is thus heated by the gases of combustion to temperatures higher than that of the electrical incandescent pin after the heater current has been switched off.

The desired ignition effect is further produced in accordance with the invention, in that an element in contact with the jet of fuel (capillary nozzle, guide pin, spreader cone, spreader body or piston head) is provided with at least one tiny obstruction or impact surface. On the impingement of the apex of the jet emerging from the nozzle upon such an obstruction at each new injection of fuel, some fuel is scattered. Through the appropriate positioning of these obstructions it becomes possible to allow the extraordinarily small quantities of fuel necessary for the formation of the initial flame to be directed upon the incandescent pin. Thereafter the jet flows over the obstructions. The effect of the impact surfaces on the pitson head is that a small quantity of fuel is scattered and is sprayed back into the incandescent hollow space. The main portion of the jet of fuel is then distributed over the piston as a film through a deflection surface which borders the impact surface. The fuel evaporates into the hot air within the combustion space and burns with a certain delay. The impact-surface and the surrounding deflection surfaces can consist of one piece with the piston-head, which may for example be formed of quartz-glass.

In association with an impulse-type pump operating on the power-storage principle the injection and ignition device operates with simple open nozzles. The mode of operation is thus dependent of the speed of the engine. The power storage pump, giving rapid injection even on starting, in conjunction with an open nozzle, ensures definite ignition of the first jet and prevents any sooting.

Figure 2:
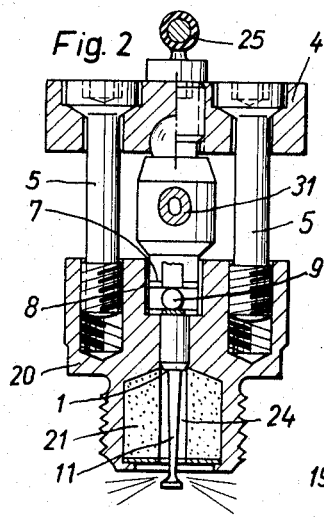
Figure 6:
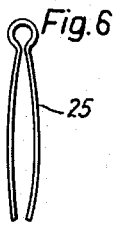
Figure 7:
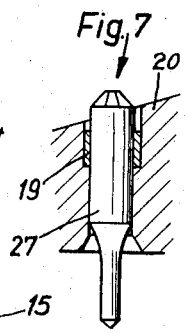
Figure 3:
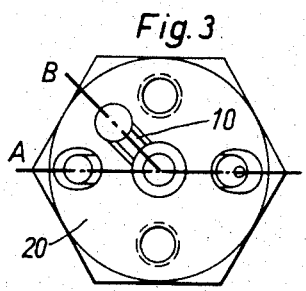
Figure 8:
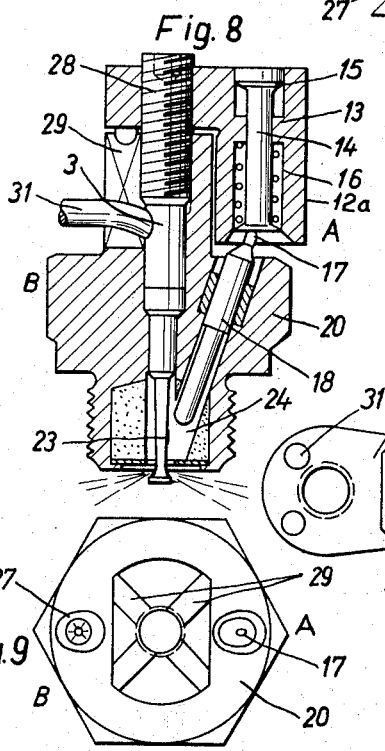
Figure 4:
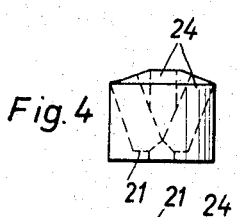
Figures 9, 10:
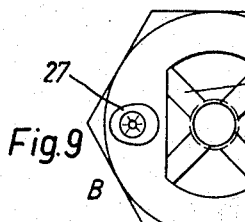
Figures 22, 23, 24:
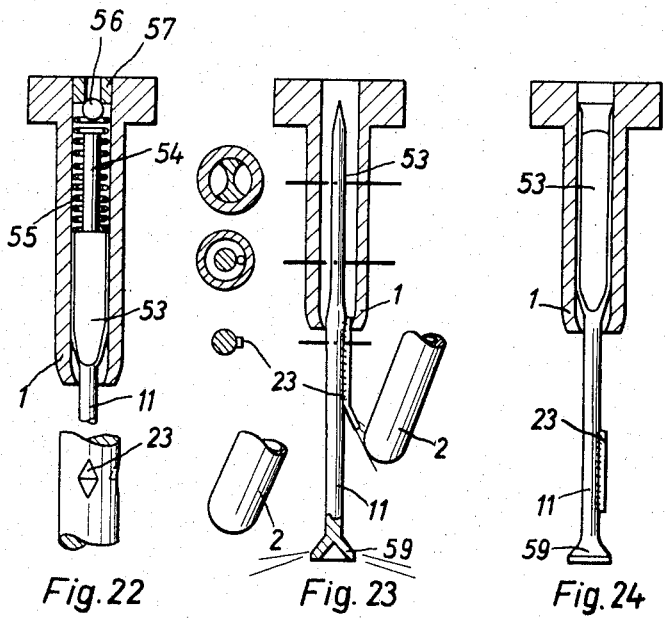
Figure 25:
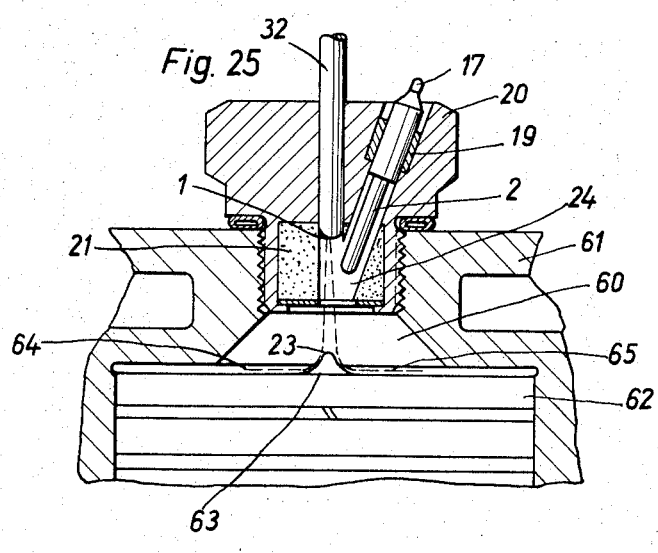

Further features and advantages of the invention will become apparent from the following description taken in conjunction with the accompanying drawings, illustrating embodiments of the invention by way of example only, in the several figures of which like elements are denoted by like reference numerals. The drawings comprise FIGURES 1 to 25, of which:

FIGURE 1 shows an axial section through a combined injection and ignition unit with central nozzle and inclinedly disposed incandescent ignition pin, FIGURE 2 shows another axial section of the same unit taken at right angles to that of FIGURE 1, FIGURE 3 shows a plan view of the unit without the connection elements for fuel and electric current, FIGURE 4 shows an elevation of the heat-insulating hollow body forming a part of the device described in relation to FIGURES 1 to 3, FIGURE 5 shows a plan thereof of the hollow body, FIGURE 6 shows a simple spring plug suitable for the connection of the heater current leads, FIGURE 7 shows an auxiliary incandescent pin of quartz-glass for simultaneous monitoring of the operation of the process of combustion, FIGURE 8 shows a cross-section through a modification of the device described in relation to FIGURE 1 with a tube nipple inserted in an extension of the plug body and also with a connecting device for the heater-current leads secured by the same screw, FIGURE 9 shows a plan view of a device as described in relation to FIGURE 8 with the connecting details omitted, FIGURE 10 shows an inverted plan of the connecting device for the heater-current leads, FIGURES 11 to 13 show different views of one embodiment of incandescent pin for use in a device according to the invention, FIGURE 14 illustrates the construction of an incandescent body having an incandescent helix arranged on a free-standing pin with melted-on insulation, FIGURE 15 shows an incandescent heater body with a cylindrical heater conductor enclosed in a ceramic protective shell, FIGURE 16 shows at a, b and c alternative forms of the cylindrical heater conductor, FIGURE 17 shows a heater body as a helix in an insulating shell of gas-tight sintered oxide material with a metallic mounting, FIGURE 18 shows an incandescent heater body with a helix in a metallic shell which is connected with the fixing tube, FIGURE 19 shows a heater body with a noble metal layer placed upon the leads, which form both a heat-conductor and a protective shell, FIGURE 20 shows an intrinsically interchangeable, endwise-stressed incandescent heater pin formed wholly of resistance material which is inserted from outside the combustion space into the lower spring contact by means of a metallic, removable seal, FIGURE 21 shows an interchangeable incandescent heater pin, which consists of a protective pin with end contacts with a heater helix formed of edge-wound strip material, FIGURE 22 shows a nozzle with conductive pin and illustrates means for the separation of droplets of fuel for forming the initial flame, FIGURE 23 shows a variant of the embodiment described in relation to FIGURE 22, FIGURE 24 shows another variant of the embodiment described in relation to FIGURE 22, and FIGURE 25 shows a section through an internal-combustion engine cylinder fitted with the injection and ignition device and a piston with a deflection surface.

FIGURES 1 and 2 show an embodiment of the injection and ignition device according to the invention. An incandescent heater body 2 formed as a pin-shaped component is arranged with its axis inclined to that of a fuel injection nozzle 1. The connecting nipple of the fuel tube 3 is pressed against the rear of the nozzle tube by means of a pressure plate 4 acted upon by screws 5 working in plug body 20. Sealing discs 7, connected by a connecting tag 6, are thus plastically deformed. On the body 8 of the nozzle 1 there is welded a ball 9, which fits in a lateral groove 10 (FIG. 3). The positioning of the fuel guide-pin 11 within the incandescent heater body 2 is thus fixed. Into pressure-plate 4 there is pressed a cylindrical insulating body 12. Within this is formed a constriction 13 which locates a contact socket 14. An out-turned edge 14 ensures against jumping out. A spring 16 presses the contact socket 15 with a few kilograms pressure against the lead-through conductor 17 of the incandescent heater body 2. The fixing tube 18 is tightly fixed by axial compression of a copper caulking ring 19 acting as a gasket into the plug body 20. The hollow heat-insulating body 21, which is manufactured for example from a quartz-glass blank by grinding and boring, is held by a heat-resisting disc 22 secured by crimping over the plug body 20.

FIGURE 3 shows a plan view of the plug body 20 with a radial slot 10, which locates the ball 9 welded on to the body 8 of the connecting nipple 3 and thus the position of the obstacle 23 discussed below.

Figure 5:
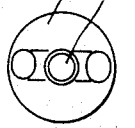

FIGURES 4 and 5 show two views of the hollow heat-insulating body 21 and illustrate the recesses 24.

FIGURE 6 shows a spring plug 25 shown also in FIGURES 1 and 2 which is formed of half-round wire and is suitable for connecting the lead 26 to secure it against vibration.

FIGURE 7 represents a pointed quartz-glass rod 27, which is fastened into the plug body 20 by means of a sealing ring 19 to form an auxiliary incandescent pin. It is heated by the flame, so that it also operates as an incandescent heated body. It makes possible the evaluation of the processes of combustion, by viewing the flame colour in the direction of the arrow.

In the embodiment described in relation to FIGURES 1 to 3 the screws 5 for securing the fuel connexion must be tightened quite uniformly; this disadvantage is avoided in the embodiment of FIGURE 8. After the plug body 20 has been screwed into the cylinder, an insulating body 12' for the contact socket 14 with a socket-head screw 28 half screwed in, is placed upon an extension of the plug body 20 which is provided with four radial grooves 29. The socket-head screw 28 is then turned into the thread in the plug body until the connecting nipple 3 is tightly pressed. Since the insulating body 12' has two projections 30 which engage in radial grooves 29 it is then secured and prevented from rotation. Because of the presence of the four grooves 29 the fuel supply pipe 31 can be led off in any of four directions.

FIGURE 9 shows a plan view of the plug body 20 and FIGURE 10 shows the insulating body 12' viewed from below. It is also possible to build a second incandescent pin 2 into the plug body 20 as a spare, and to connect it in circuit by changing the position of the insulating body 12'.

FIGURES 11 to 21 show various embodiments of very small incandescent pins suitable for inclusion in the embodiments described above. In the arrangement shown in axial section in FIGURE 11, the incandescent body 2 consists of an incandescent wire coming to a peak, which can be designed for a heater voltage of some 0.5 volt. The heater wire may consist, for example, of an iron-chromium alloy. The lead-through connexion 17 is secured in the fixing tube 18 by a glass seal 33 formed by a tube pushed into the fixing tube and there fused. The fixing tube 18 also forms the earth electrode to which one end of the heater wire is welded. Tube 18 is secured in a counterbored hole in the plug body 20 in a gas-tight manner with radial pre-stress. The sealing ring 19 is preferably of copper, the greater thermal coefficient of expansion of which equalizes the smaller thermal expansions of the fixing tube 18 of nickel-iron, of the melted-in glass 33 and of the lead-through connexion 17. On heating, therefore, there occurs no slackening of the seal with regard to the plug body 20, consisting of free-machining steel. Breakage of the sealing glass 33 and loss of seal are thus prevented.

The incandescent heater body consisting of short, moderately thick wires is fed by way of a transformer 32 with a voltage of for example 0.4 to 1 v. The transformer receives its current from a source of alternating current, for example, from a chopper (not shown) with a pulse frequency of 2 kc./s.

FIGURES 12 and 13 show two views, one an axial section, one a plan, of a similar arrangement, the incandescent rods consisting of iridium. Two thin and one thick rods welded together form a triangular braced, rigid structure.

FIGURE 14 represents in axial section a thin, retractable incandescent element, in which the return conductor 39 at the beginning of the lead 17 consists of tungsten or molybdenum or the like and is covered by a thin skin or layer 34 of an oxide with a very high melting point, on to which is wound a heater-wire helix 35 of molybdenum, tantalum, tungsten or the like. This is welded to the end of the return conductor 39. The other end of the helix is led to a short thin auxiliary tube 36 with a collar which is pressed or tightly welded into the fixing tube 18. The lead-through connexion 17 is secured within the fixing tube 18 in a gas-tight manner by means of sealing glass 33. The return lead 39 with the helix 35 is located with respect to the auxiliary tube 36 by a filling of the finest quartz powder or other suitable oxide material, dried, and covered with a gas-tight layer of oxide melted-on in a protective gas atmosphere and forming a protective shell 37.

FIGURE 15 shows an axial section through a device of a similar construction. The lead-through connexion 17 of molybdenum or copper-sheathed wire is welded to a heater return lead, for example of tantalum. Over this lead but insulated from it is placed a heater shell 40, for example of tantalum, and this is welded to the free end of the return conductor. Sealing glass 33 insulates the lead-through connexion 17 from the fixing tube 18. A somewhat shorter ceramic protective shell 37 is placed over the incandescent shell 37 and connected in a gas-tight manner with the fixing tube 18. This is then crimped or spun over the protective shell 40 in order to obtain good contact. The heater shell 40 can also be replaced by a rolled tube or a tube formed from helically wound tape.

FIGURE 16 shows these three kinds of heater shell, a being a plain tube, b a rolled tube and c a tube formed of wound tape.

FIGURE 17 shows an axial section through an embodiment with a gas-tight sintered ceramic protective shell 37 placed around an incandescent heater body 2. This shell may be formed for example of sintered aluminium oxide, silicon nitride or the like. The protective shell 37 is soldered into the fixing tube 18 by means of a layer 41 of noble metal. The layer covers the ceramic protective shell 37, so reducing the heat radiation and thus also the heating power necessary. The enclosed heater helix 35 is welded at its forward end to the internal return conductor 39. The other end of the helix is pressed against the inner wall of the fixing tube 18 by means of a small spring ring 42 or is welded to it. Sealing glass 33 forms the gas-tight seal.

FIGURE 18 shows in axial section a further embodiment, but with a metallic protective shell 43. This preferably consists of a high melting point metal, e.g. molybdenum, with a molybdenum silicide coating. A thin oxide shell 34 protects the heater helix 35 from contact with the inner wall. One end of the heater spiral is welded to the bottom of the heater shell 43, while the other end is connected with the return conductor 39. The metallic incandescent shell 43 is welded in a gas-tight manner to the fixing tube 18. This arrangement is suitable for temperatures up to 1600° C. and is particularly resistant to shock.

FIGURE 19 shows an axial section through an incandescent pin of particularly thin construction. To the lead-through connection 17 is welded a thin return conductor 39, which may for example be formed of tantalum. Over the return conductor there is disposed, leaving the lower end free, an oxide skin 34, or a paste of appropriate insulator which is then dried and fused in an inert atmosphere.

After the evaporation of a conductive layer the body is then suspended in an electroplating bath and a layer 44 of tantalum, iridium or like refractory metal is placed over the oxide layer 34 to just below its upper end. The plated-on layer 44 serves as the heater element. Contact with the plated iridium layer is produced by drawing-down the fixing tube 18, which is insulated from the lead-through connection 17 by sealing glass 33.

FIGURE 20 shows an axial section through a heater element with an interchangeable heater rod 2, preferably formed of silicon carbide. A tongue 45 protruding from the mounting disc 22 for the heat-insulating hollow body 21 presses the incandescent rod 22 against a pistonlike rod 46 axially movable within an insulating fixing tube 50. A layer 41 of noble metal formed on the contact surface produces a low contact resistance. The rod 46 preferably consists of nickle-iron of low thermal conductivity. Its upper end is conical and presses against a small ring 47 of a plastic metal, such as lead, zinc, silver or the like in the fixing tube so that this ring seals tightly against the walls of the tube. The likewise conically ended rod 49 carrying the external connection 17 is also pressed against ring 47 by means of a spring 16 working on the contact socket 14 of the insulating body as shown in FIGURES 1 and 8. The spring pressure may amount to some 3 or 4 kg., in order to withstand the highest possible pressure of gas upon the heater rod 2. The arrangement therefore possesses both good sealing and continuously reliable uniform contact during thermal expansion, and contraction and allows for tolerances on interchanging the incandescent rod. The insulating fixing tube 50 preferably consists of oxidised aluminium.

In FIGURE 21 the body of the heater 2 is formed of a flat oxidised heater wire close wound on edge upon a ceramic rod core 51 and having noble metal contact caps 52. Attack by the products of combustion can take place only upon the exposed surface of the heater, so that, despite the use of the thin heater wire, the heater element has an unexpectedly long life.

The incandescent elements described, which may be made of very small size, make it possible to employ injection and ignition devices in accordance with the invention in the smaller sizes of normal ignition plugs with high reliability in operation.

FIGURES 22 and 25 show means for briefly scattering a small quantity of droplets to form the initial flame upon ignition. The peak of the jet of fuel is scattered on impinging upon a very small obstacle 23. After this the relatively small obstacle is simply submerged by the larger volume of the subsequent jet of fuel, so that droplets are no longer scattered.

FIGURE 22 shows the nozzle 1 of FIGURE 1 on an enlarged scale and in section, a portion being shown still further enlarged. The shaft 53 of the fuel guide pin 11 is pressed flat and is provided with a turned extension 54. A two-start spring 55 surrounding extension 54 holds a small valve-ball 56 against a pressed-in valve seat ring 57. This non-return valve prevents any subsequent dripping of fuel.

The guide-pin 11 is provided with a small obstacle 23 in the form of an indentation and tooth, similar to the tooth of a rasp, to form a scattering point for fuel droplets.

FIGURES 23 and 24 represent longitudinal sections of the nozzle 1 in directions at 90° to each other. The guide-pin is made flat in the upper part of its shaft and is pressed into the nozzle 1. The lower end of pin 11 is bored-out somewhat hollow and after the fixing of the guide-pin into the nozzle 1 is shaped into the spreader head 59 by a pressing process. Such a head may also be fastened to the plain end of a guide pin by spot welding. In FIGURE 23 a thin wire forming the obstacle 23 is fastened to the side of guide pin 11. Wire 23 reaches into the mouth of the nozzle 1 and is positioned with its free end somewhat spaced from the surface of guide-pin 11. At the beginning of each injection of fuel a certain quantity of droplets are scattered from the apex of the fuel jet by the end of the wire and thus pass to the incandescent body 2.

When the following jet of fuel 60 flows over the end of the small wire the scattering comes to an end.

In the arrangement shown in FIGURE 24 a short piece of fine wire is welded to the middle of guide-pin 11, the upper end of the wire serving to scatter the initial fuel jet. On the first impact of the jet a number of droplets are diverted and strike the incandescent body 2. After this the jet flows over the obstacle and again follows its initial direction.

The new arrangement, employing only a relatively very small incandescent body makes possible, even with only a moderate heating power, reliable starting of internal combustion engines fitted therewith, even in great cold. It is now possible to proceed from a standstill immediately upon starting without previous idling of the engine.

FIGURE 25 shows an injection and ignition device according to the present invention, in which the fuel jet is sprayed freely through the narrow hollow space 24 within a hollow, heat-insulating body 21, fitted into the cylinder-head 61 of an internal combustion engine. On the head 62 of the piston there is placed a deflection surface 63 formed in one with the head, which distributes the fuel jet over the piston-head on all sides as a thin film 65 and thus briefly retains it. This film evaporates through the heat in the combustion space and also of the piston-head and burns with a slight delay.

As compared with all formerly known incandescent heater plugs the injection and heater device according to the present invention requires substantially reduced heater power. It also makes possible a substantially increased operating temperature and thus yields the possibility of operating incandescent ignition engines equipped with the device with increased efficiency even at high speeds. Its simple and economical construction makes the device suitable for the widest application.

It is intended that all matter contained in the above description or shown in the accompanying drawings shall be interpreted as illustrative and not in a limiting sense.

What is claimed and desired to be secured by Letters Patent is:

1. A unitary fuel injection and ignition device for an internal combustion engine comprising, in combination, a body of thermally insulating material and formed with a first bore of uniform diameter therethrough forming a chamber of small volume and communicating at one end of said first bore with the combustion chamber of the engine; a pin-shaped electrically heatable igniter element located with small clearance in a second bore formed in said body inclined to and intersecting said first bore in such a manner that the tip of said element is located at the intersection of said second and said first bore substantially aligned with the surface of the latter; nozzle means communicating with the other end of said first bore for intermittently injecting fuel thereinto; elongated guide means coaxially arranged with said nozzle means projecting therefrom past said tip to said igniter element at least to said one end of said bore for guiding a jet of fuel injected by the nozzle means closely spaced from the inner surface of said first bore through the latter into the combustion chamber of the engine so that only scattered droplets of said fuel will reach a hot layer of air surrounding said tip of said igniter element to be instantaneously ignited thereby; and means for supplying electric current to said igniter element for heating the latter.

2. A device in accordance with claim 1, in which said guide means include means for scattering of fuel droplets from an initial portion of each jet, said last-mentioned means being arranged to direct said droplets toward the tip of said igniter element.

3. A device in accordance with claim 1, in which said heat-insulating body is formed with a third bore having an axis intersecting the axis of the first bore at the same point as the axis of said second bore, and including a further pin-shaped ignited element located with small clearance in said third bore, the tip of said further igniter element being located at the intersection of said third and first bore substantially aligned with the surface of the latter.

4. A device in accordance with claim 3, in which said guide means include means for scattering of fuel droplets from an initial portion of each jet, said last-mentioned means arranged to direct said droplets towards the tips of said first-mentioned and said further igniter elements.

5. A device in accordance with claim 4 in which said further igniter element is an electrically heatable element.

6. A device in accordance with claim 4 in which said further igniter element is an electrically heatable element and comprising also means operable to supply electric current selectively to said first or to said second igniter element.

7. A device in accordance with claim 4 in which said further igniter element is a body of heat-insulating refractory material.

8. A device in accordance with claim 4 in which said further igniter element is constituted by a fused quartz rod, said rod being mounted to permit light to pass lengthwise thereof from an end thereof which when said device is mounted for operation as an element of an internal combustion motor is within a combustion space of said motor to an end of said rod which is outside said combustion space.

9. A device in accordance with claim 1 in which said body is formed of a material selected from the class of refractory ceramic oxides.

10. A device in accordance with claim 1 in which said body is formed of fused quartz.

11. A device in accordance with claim 1 in which said ignited element comprises a mounting tube; a lead-through conductor extending axially through said tube; said conductor being radially spaced from said tube; electrically insulating material within said tube sealed to said tube and to said lead-through conductor; and a heater element electrically connected between said mounting tube and said lead-through conductor.

12. A device in accordance with claim 11 in which said heater element consists of a single length of wire bent to form two limbs embracing an acute angle.

13. A device in accordance with claim 11 in which said heater element comprises a tube of resistive material; a direct connexion between one end of said tube and said mounting tube; a return conductor extending exially of said tube; insulating material spacing said return conductor from said tube; and a direct connexion between the return conductor and the other end of said tube.

14. A device in accordance with claim 13 in which said tube is formed from a helically wound metal strip.

15. A device in accordance with claim 13 in which said tube is formed as a rolled close-joint tube having a longitudinal joint.

16. A device in accordance with claim 11 in which said heater element comprises a return conductor connected to said lead-through conductor and defining an axis; a layer of insulating material surrounding said return conductor; and a resistive element wound as a helix upon said insulating layer, said element being connected at one end to said return conductor and at the other end to said mounting tube.

17. A device in accordance with claim 16 in which said insulating layer is formed by oxidation of the surface of said return conductor.

18. A device in accordance with claim 16 in which said helically wound element is a surface-oxidised strip close wound on edge.

19. A device in accordance with claim 11 in which said heater element comprises a return conductor connected to said lead-through conductor; a layer of insulating material surrounding said return conductor; and a conductive layer of noble metal formed upon the surface of said insulating layer.

20. A device in accordance with claim 18 in which said conductive layer is formed of iridium.

21. A device in accordance with claim 11 in which said heater element consists of a rod of refractory resistive material.

22. A device in accordance with claim 11 in which said heater element consists of a rod formed of a material selected from the group consisting of silicon carbide and molybdenum silicide.

23. A device in accordance with claim 11 in which said heater element is supported in a releasable manner from said mounting tube.

References Cited

UNITED STATES PATENTS

| | | | |
|---|---|---|---|
| 1,223,124 | 4/1917 | Thompson | 123—32 |
| 1,432,214 | 10/1922 | Sperry | 123—169 |
| 1,463,855 | 8/1923 | Tartrais | 123—145 |
| 1,609,688 | 12/1926 | Briggs | 123—145 |
| 1,963,578 | 6/1934 | Dorner | 123—32.6 |
| 2,030,937 | 2/1936 | Reichmann | 123—145 |
| 2,057,318 | 10/1936 | Schwaiger | 123—32.8 |
| 2,075,911 | 4/1937 | Roth | 123—32 |
| 2,130,365 | 9/1938 | Paulson | 123—145 |
| 2,142,280 | 1/1939 | Mock | 123—32 |
| 2,229,552 | 1/1941 | Cowardin et al. | 123—32.6 |

FOREIGN PATENTS

| | | |
|---|---|---|
| 1,274,295 | 9/1961 | France |
| 905,907 | 3/1954 | Germany. |

LAURENCE M. GOODRIDGE, *Primary Examiner.*